Aug. 3, 1943.　　　　G. LESSMAN　　　　2,326,042
PROJECTOR AND VIEWING SCREEN
Filed Sept. 11, 1939　　　8 Sheets-Sheet 3
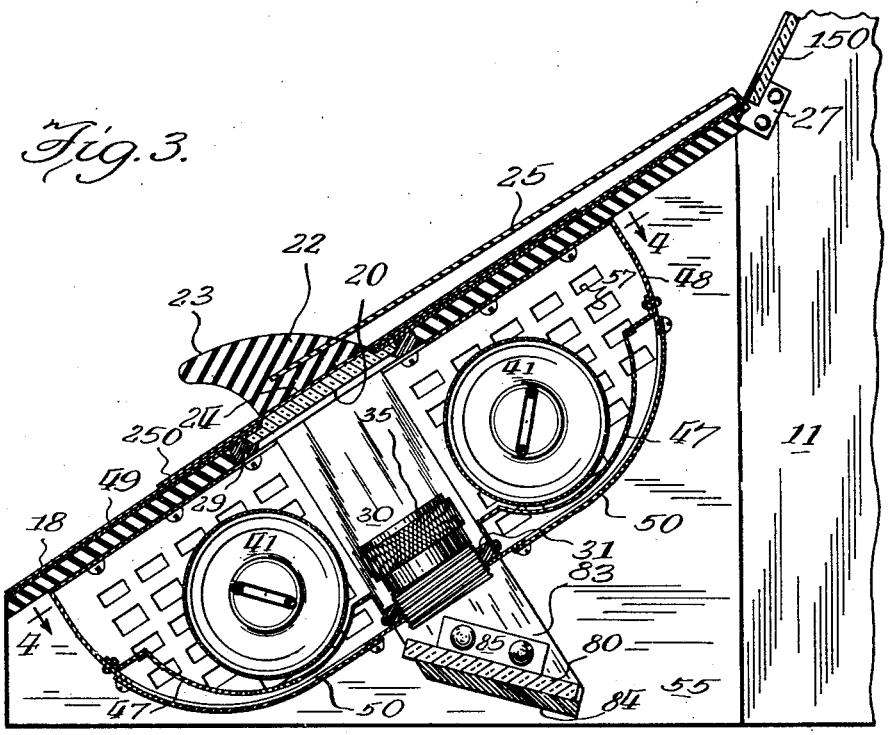
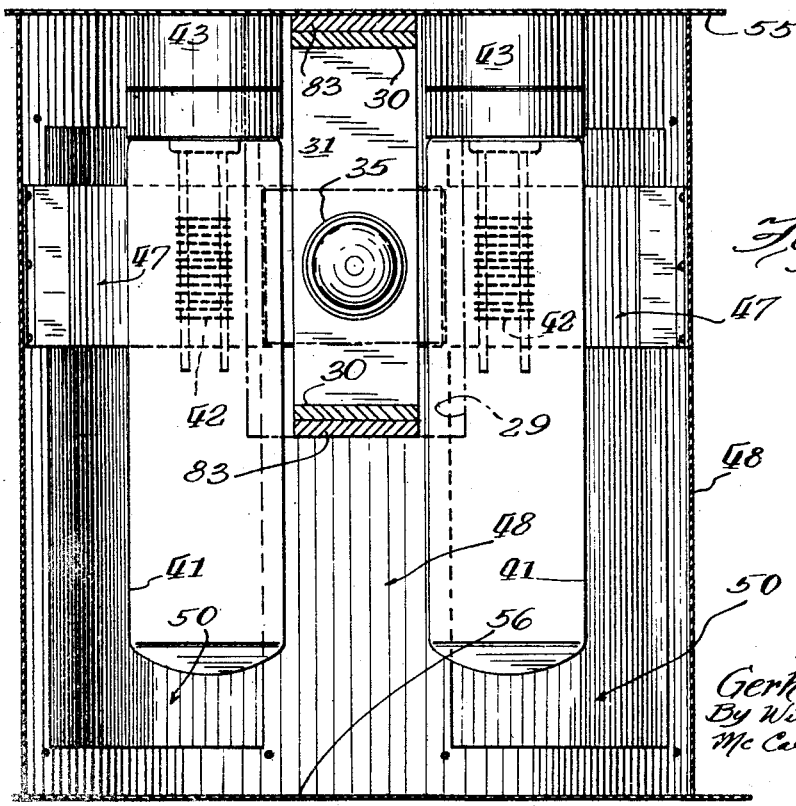
Inventor
Gerhard Lessman
By Williams, Bradbury,
McCaleb & Hinkle
Attys.

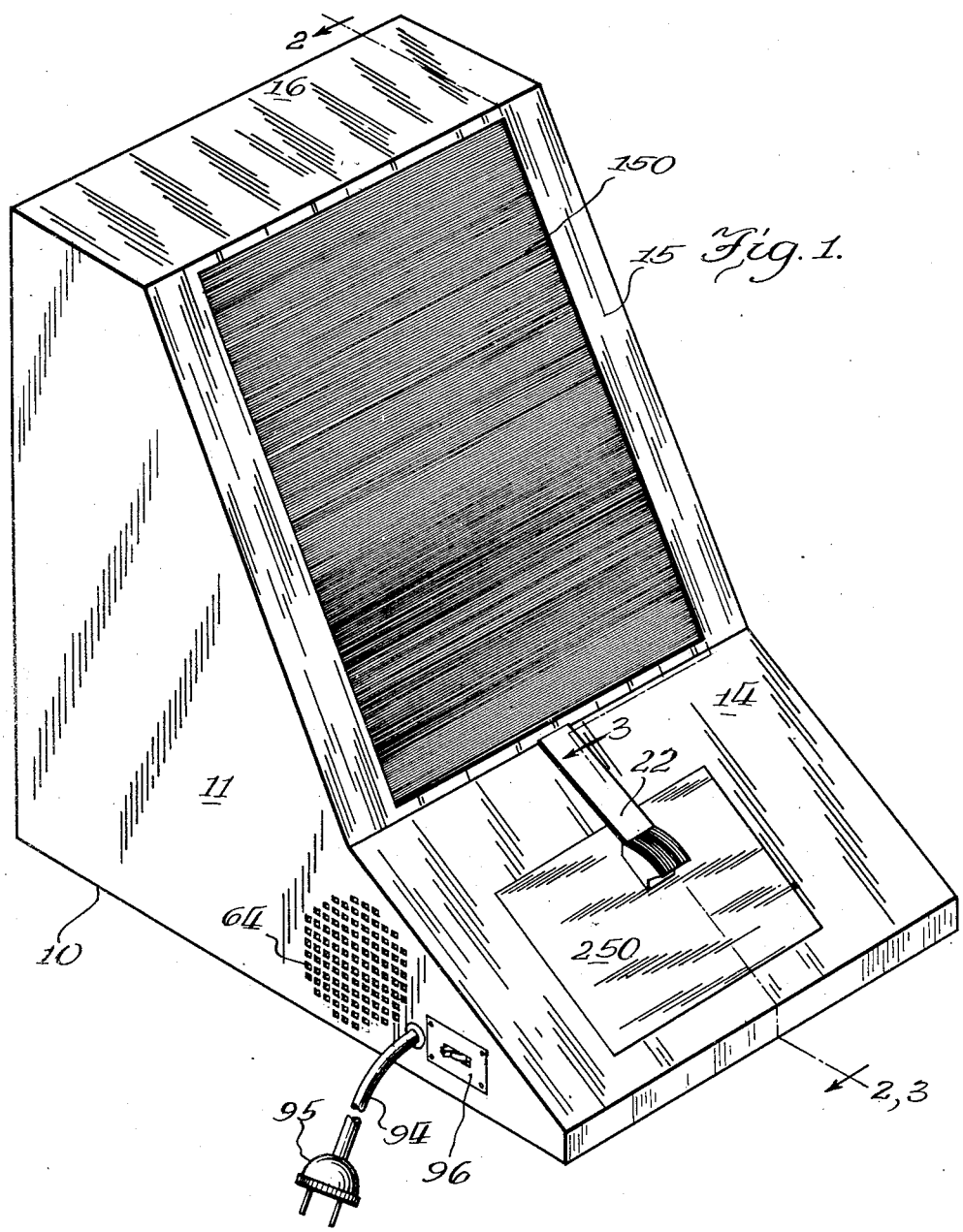

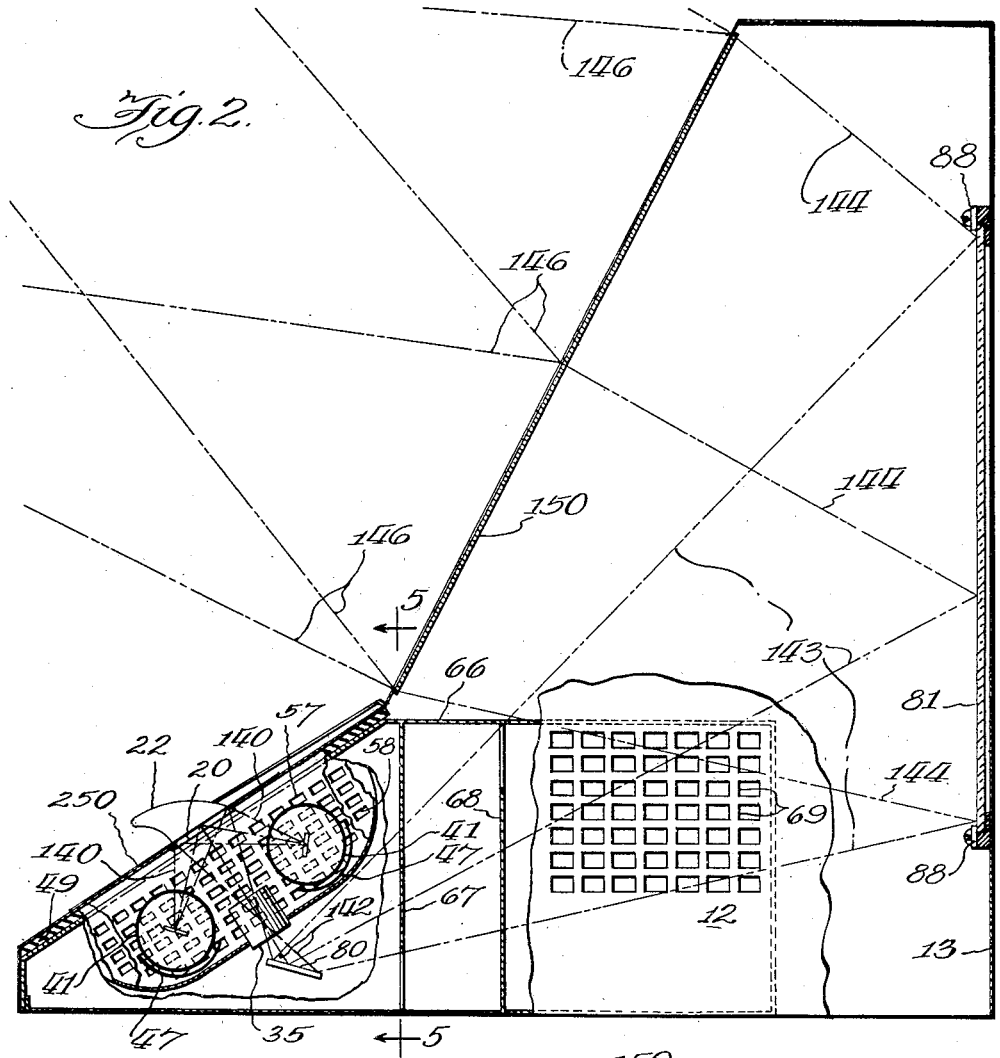
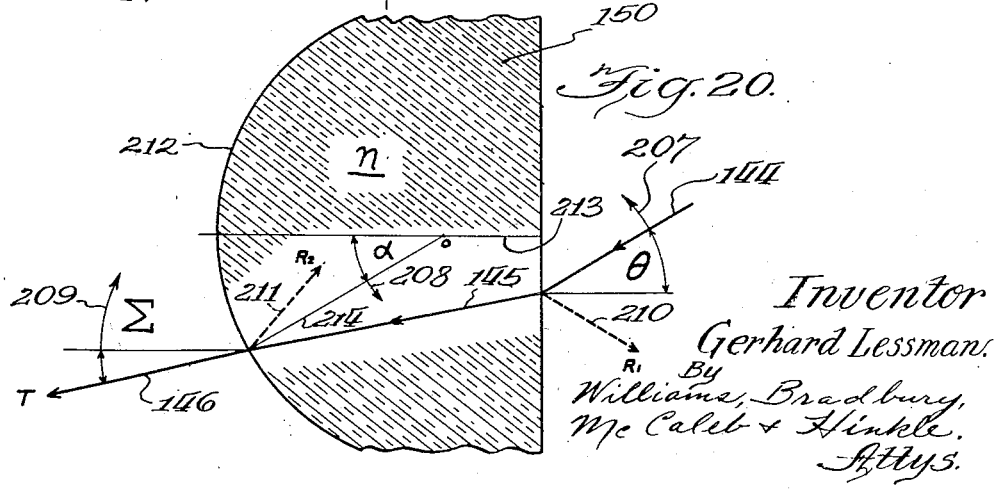

Aug. 3, 1943.  G. LESSMAN  2,326,042
PROJECTOR AND VIEWING SCREEN
Filed Sept. 11, 1939  8 Sheets-Sheet 4
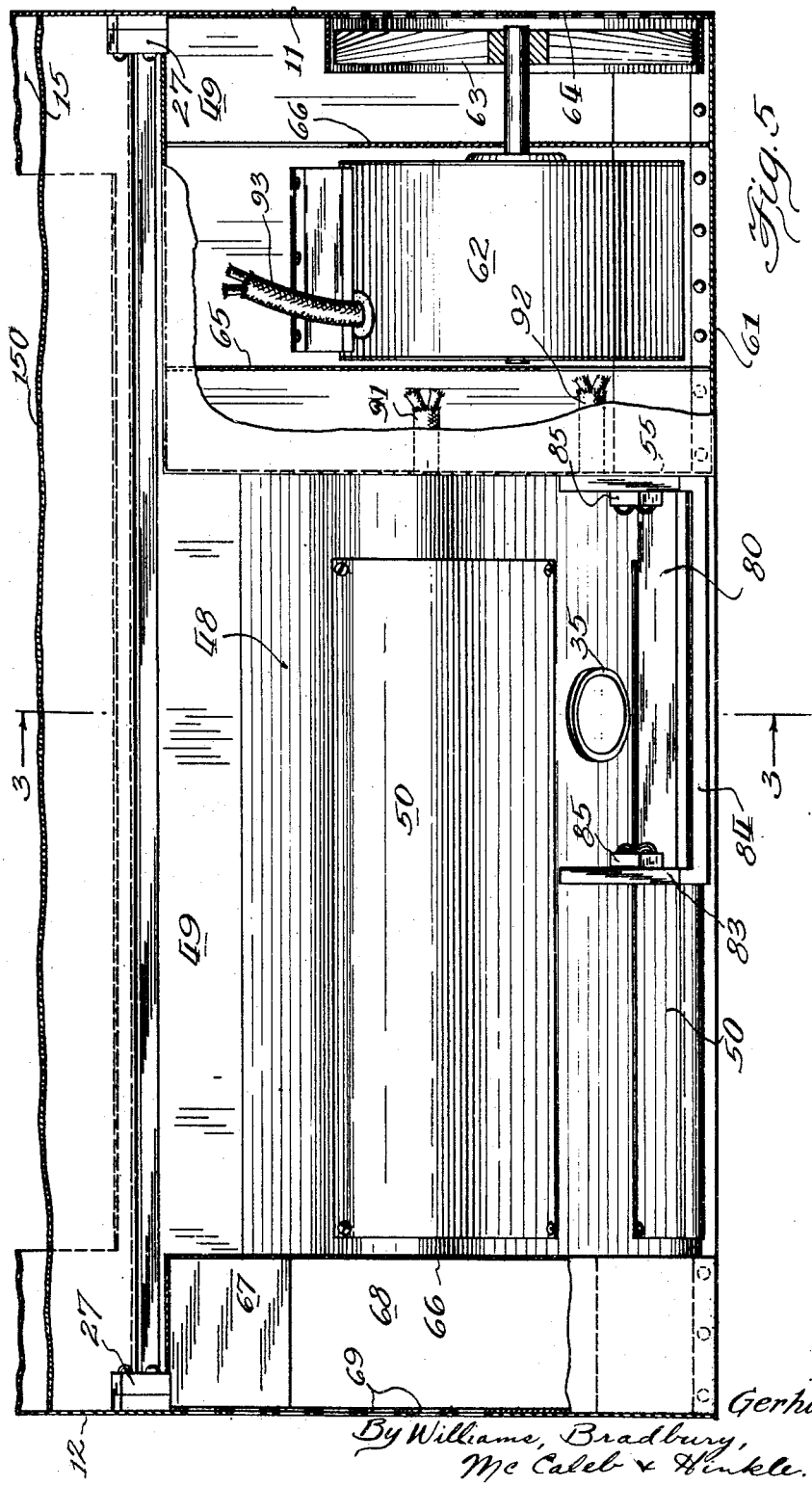
Inventor
Gerhard Lessman
By Williams, Bradbury,
McCaleb & Hinkle. Attys.

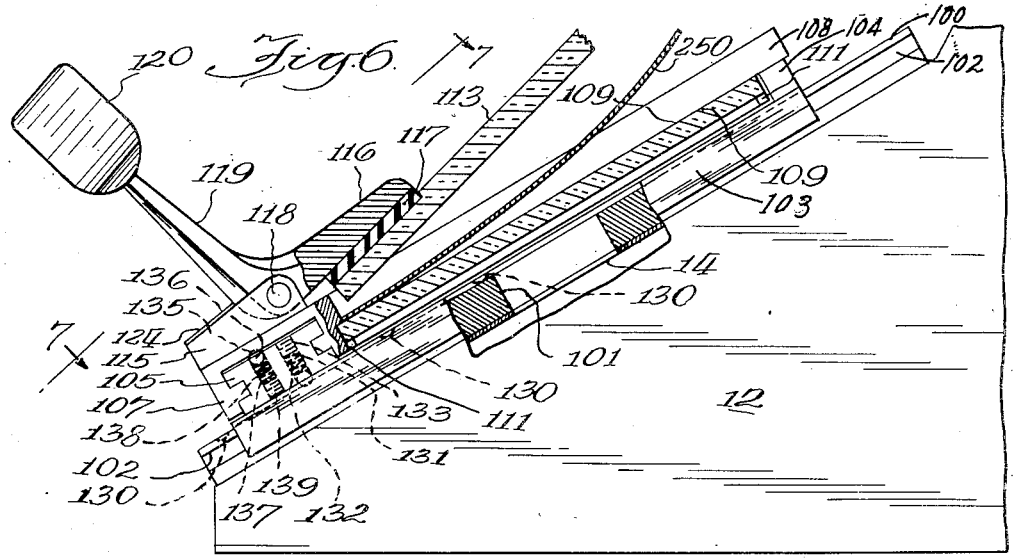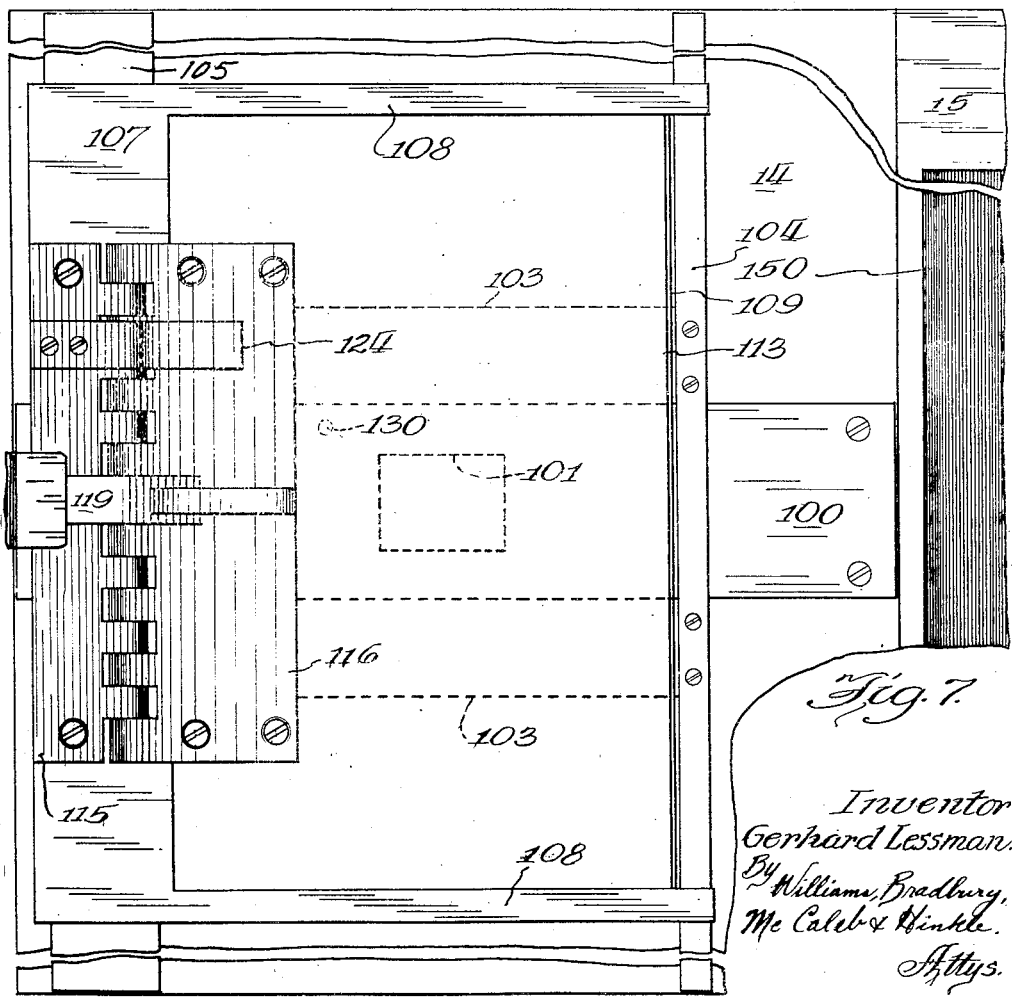

Aug. 3, 1943.	G. LESSMAN	2,326,042
PROJECTOR AND VIEWING SCREEN
Filed Sept. 11, 1939	8 Sheets-Sheet 6

Fig. 8.

OFFICIAL GAZETTE
Vol. 386, No. 1, September 3, 1939, p. 1-32

Inventor
Gerhard Lessman
By Williams, Bradbury,
McCaleb & Hinkle, Attys.

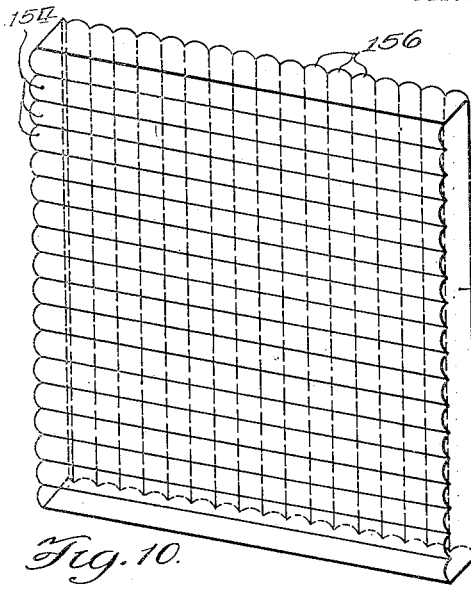
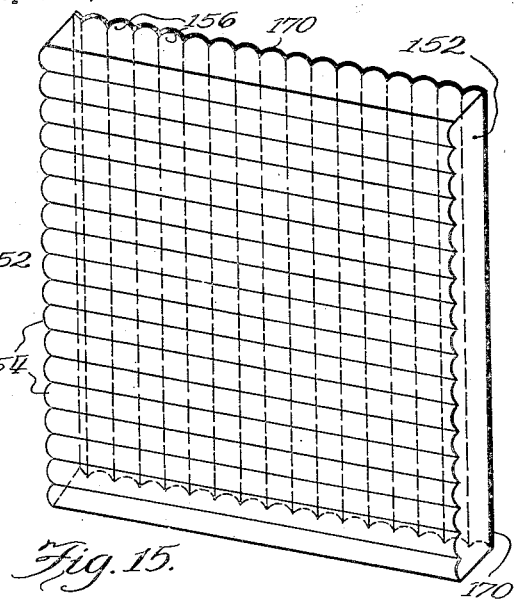
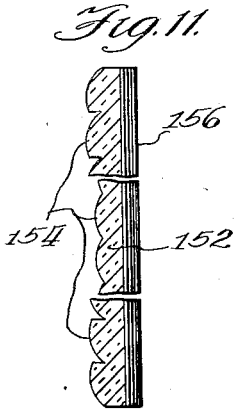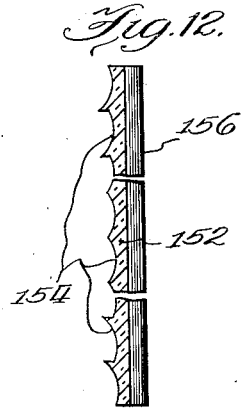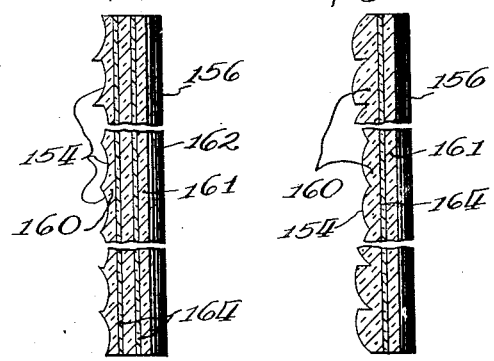
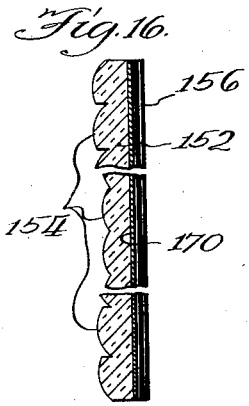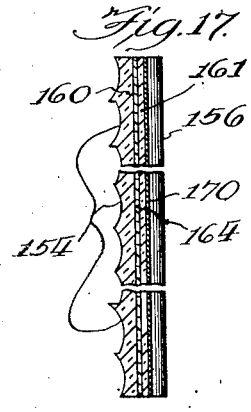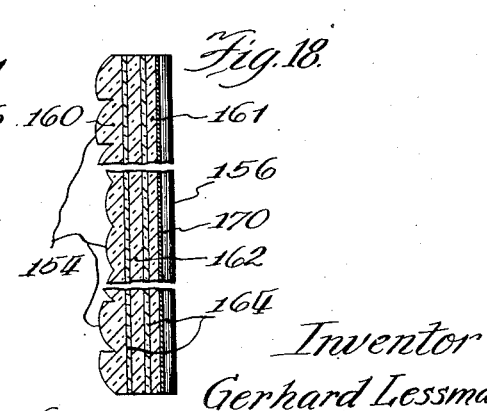

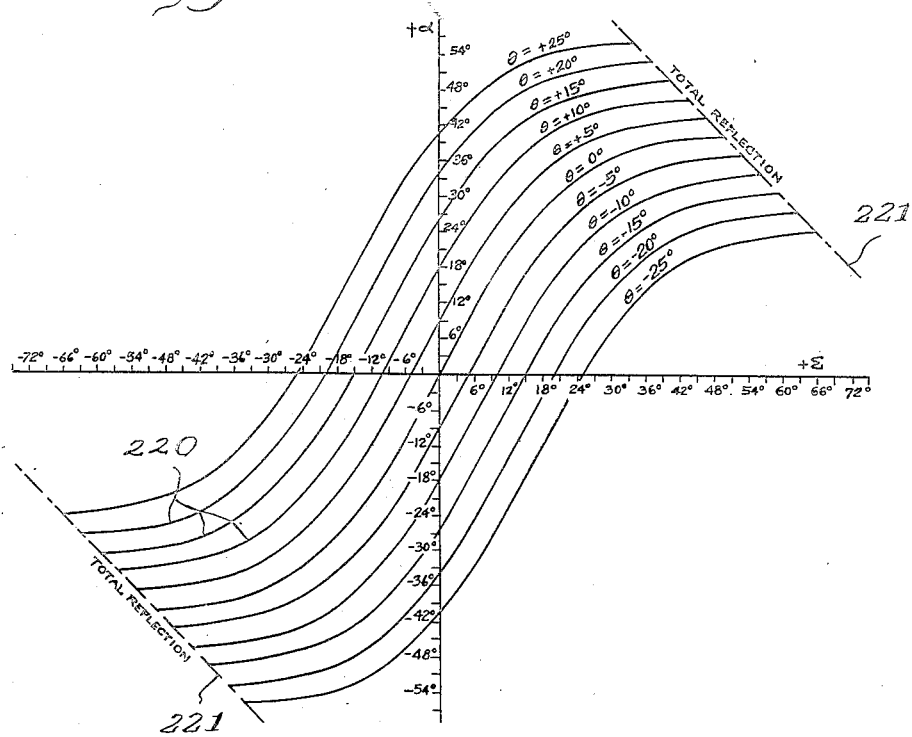
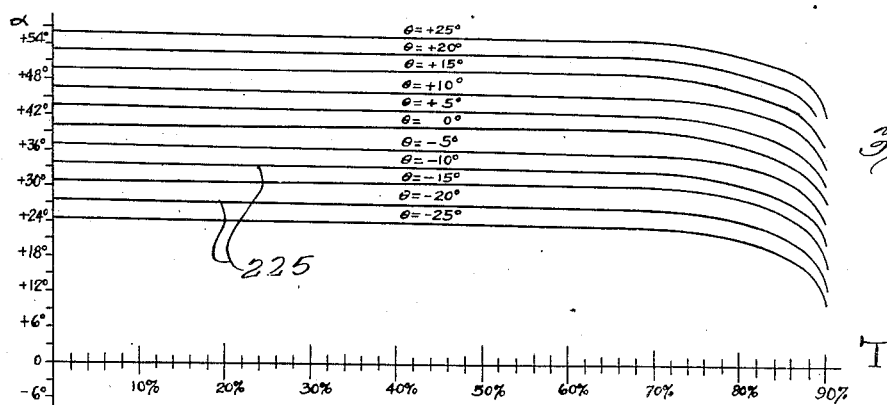
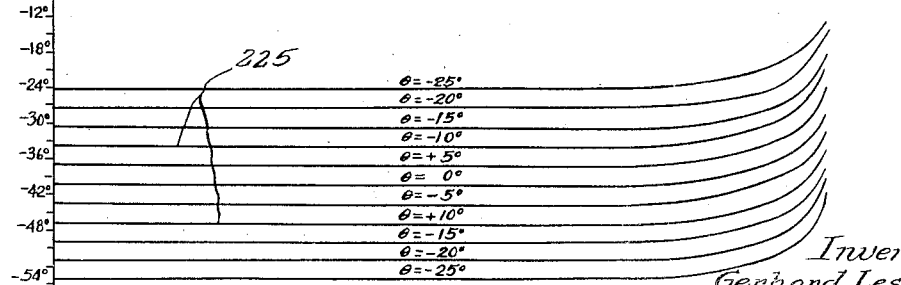

Patented Aug. 3, 1943

2,326,042

UNITED STATES PATENT OFFICE 2,326,042

PROJECTOR AND VIEWING SCREEN

Gerhard Lessman, Chicago, Ill., assignor to Stephen Junkunc, Jr., Oak Park, Ill.

Application September 11, 1939, Serial No. 294,224

10 Claims. (Cl. 88—24)

My invention relates to optical projecting apparatus, and particularly to a system of reflectively projecting enlarged images from miniature opaque photographic prints on to a viewing screen having an extremely high illumination efficiency.

The use of optical projectors has been confined almost exclusively to darkened interiors, or to the outdoors after dark, because the relatively dim image produced by most projectors does not give sufficient contrast against daylight to be readily visible. Attempts have been made to project in daylight, in the advertising art for instance, which have not been very satisfactory because of the low intensity of the image produced by available apparatus.

I have discovered that there are only three possible methods of increasing the actual intensity of the projected image upon a viewing screen, all three of which involve increasing the actual intensity of the light directed toward the observer. One method consists of increasing the intensity of the light directed upon the screen by the projector. However, the projector illumination usually cannot be increased because of the danger of overheating the photographic print in the projector. Another method of increasing the intensity of the projected image is to provide a viewing screen by means of which the light from the projector is reflectively or refractively diffused through a relatively narrow viewing angle, instead of through a full hemisphere, as in the case of perfect diffuse reflectors. It is not necessary in most cases to have a viewing angle larger than about thirty-five degrees, and since reducing the viewing angle one-half increases the light intensity about four times, because the same amount of light is concentrated into about one-fourth of the former solid angle of diffusion, the intensity of the image can be enormously increased by this method alone. Prior attempts to increase image visibility by this method suffered from the disadvantage, among others, that directional control of diffusion was not possible. A third method of increasing the intensity of the image is to lower the losses of the viewing screen. Translucent ground glass, for example, may waste one-third of the light from the projector by reflection, and will diffusively transmit only the remaining two-thirds of the light, most of which remaining light is diffused in directions where no use can be made of it.

In addition to increasing the actual intensity of the image upon the viewing screen, by one of the three abovementioned methods, the apparent intensity of the image upon a screen can be increased by providing a screen reflecting only a small quantity of extraneous light back to the observer, thereby greatly increasing the contrast of the image projected upon the screen. The use of a directive diffusing screen having a limited angle of view also decreases the amount of extraneous light reflected to the observer, especially in the case of reflecting screens, because extraneous light from only a few predetermined directions is reflected to the observer. Consequently, the projected image will appear to be brighter because of the increased contrast obtained. It should be noted that an increase in image contrast is fully as effective for increasing visibility as an increase in actual intensity.

The viewing screen of my invention utilizing the methods of increasing image visibility delineated above will be described subsequently. This screen has a wide field of usefulness, for upon it may be projected moving pictures at home or in the theatre, to produce brilliant pictures with relatively weak sources of illumination in undarkened interiors. My screen is intended to facilitate the outdoor projection of commercial moving pictures or still pictures, because the bright image produced by it will not be excessively dimmed by daylight or street illumination at night. Although the screen I shall describe will be suitable for the above-mentioned uses, I shall describe a screen especially adapted for use with a novel projector which is an equally important part of my invention as disclosed in this patent.

I call my novel projector a record projector, because it is intended for the reproduction of miniature photographic records of books, periodicals, papers, and printed or manuscript records, in order greatly to decrease their bulk, which bulk is becoming of serious inconvenience.

Record projectors have come into use within the last few years for the recording of checks, census records, newspaper files, and similar bulky reading matter. They invariably have been designed to use standard motion picture film, each small frame thereof representing a page of reading matter. These projectors have generally been built with reflectively diffusing viewing screens surrounded by an awkward and bulky cabinet which served chiefly to shade the screen. Others were provided with translucent screens, shaded by folding doors or wings and preferably used in a semi-darkened room.

Previously, record projectors have been confined to applications where their utility outweighed the inconvenient necessity of using them in subdued light. The rolls of film used in these projectors are awkward to handle, especially when they become unwound and get tangled up; they are sensitive to abrasion; and they prove time-consuming in use because the entire roll may have to be unwound in order to view one of the last frames, and must then be rewound. Rolls of film also suffer from the disadvantage that individual frames or groups of frames cannot readily be identified without using the projector to view them. Rolls of film are not adapted to the convenient card filing systems so extensively used by modern offices and libraries.

Record projectors for reproducing books and periodicals have not found popular acceptance because their disadvantages, as listed above, have made them unsuitable for use in broad daylight, on the desk of the scholar or executive. A projector suitable for popular use must be compact, it must have high illumination efficiency, and it must operate with more convenient materials than rolls of film. The projector I shall describe meets these requirements. It is of compact and graceful design; it makes use of the highly efficient viewing screen which is a part of this invention; and it is designed for use with opaque photographic prints of standard file card size, having appropriate reference information printed on the back thereof. This projector is suitable for general use by students, lawyers, engineers, librarians, and business men, because of its simple and compact design, and because of the convenient manner in which the cards therefor can be filed, identified, supplied to the projector, and the desired frame or page selected from the plurality of miniature photographic reproductions of printed pages upon the face of the card.

The principal object of my invention, therefore, is the provision of a record projector suitable for popular use, of compact design having a novel viewing screen of high illumination efficiency, and operating with opaque cards instead of transparent roll film.

Another object of my invention is the provision of an easily manufactured viewing screen of high illumination efficiency, having accurately predetermined diffusion characteristics.

Another object of my invention is the production of miniature photographic reproductions of normally bulky reading matter upon opaque cards of convenient standard size, bearing a plurality of such miniature reproductions upon their face, and bearing appropriate printed reference information prominently displayed upon their back, readable at a glance without the use of the projector.

Another object of my invention is to provide a method of recording and reproducing bulky printed or written material by photographically reproducing the originals in miniature form upon opaque cards of convenient standard size bearing a plurality of such reproductions, and reflectively projecting enlarged images of said reproductions upon a viewing screen of high illumination efficiency.

Further objects and advantages of my invention will become apparent upon reading the following description taken in conjunction with the accompanying drawings, in which:

Fig. 1 is a perspective view of my record projector;

Fig. 2 is a more or less diagrammatic section therethrough taken along lines 2—2 of Fig. 1;

Fig. 3 is a section through said projector taken along the lines 3—3 of Fig. 1;

Fig. 4 is a section taken along the lines 4—4 of Fig. 3;

Fig. 5 is a section taken along the lines 5—5 of Fig. 2;

Fig. 6 is an end elevation of an alternative form of my invention including a card holder and carriage;

Fig. 7 is a plan view of said modification, looking along the lines 7—7 of Fig. 6;

Fig. 8 is a back view of one of my record projector cards;

Fig. 9 is a face view of one of my record projector cards;

Fig. 10 is a greatly enlarged perspective view of a refractively diffusing viewing screen according to my invention;

Fig. 11 is a section through one of my refractively diffusing viewing screens;

Fig. 12 is a section through a modified form of refractively diffusing viewing screen;

Fig. 13 is a section through a modified form of refractively diffusing viewing screen;

Fig. 14 is a section through a modified form of refractively diffusing viewing screen;

Fig. 15 is a greatly enlarged perspective view of a reflectively diffusing viewing screen according to my invention;

Fig. 16 is a section through one of my reflectively diffusing viewing screens;

Fig. 17 is a section through a modified form of reflectively diffusing viewing screen;

Fig. 18 is a section through a modified form of reflectively diffusing viewing screen;

Fig. 19 is a greatly enlarged plan view of one of the tools employed for the production of my viewing screens;

Fig. 20 is a diagram representing the optical path of a ray of light passing through a refractively diffusing viewing screen;

Fig. 21 is a set of curves representing the relationship, for a refractively diffusing viewing screen, between the angle of incidence, the angle of transmission, and the degree of curvature of the screen grooves; and Fig. 22 is a set of curves representing the relationship, for a refractively diffusing viewing screen, between the angle of incidence, the degree of curvature of the screen grooves, and the per cent of the incident light transmitted to the observer.

In all of the figures of the drawings, like reference numerals refer to similar parts.

My record projector comprises a generally pedestal-like cabinet 10 (Fig. 1) having left and right side walls 11 and 12, respectively, a rear wall 13, an easel 14, a viewing screen frame 15, and a top 16. This cabinet may suitably be constructed of sheet metal, preferably welded together at joints and corners.

The easel 14 serves to support what I call the "recordex" cards 250, bearing miniature photographic reproductions of printed or other graphic material in closely adjacent row and column arrangement, as I shall describe in greater detail later. The easel may be covered with a cloth or felt layer 18 (Fig. 3) to avoid scratching the photographic emulsion upon the face of card 250 in contact with the easel 14. A rectangular opening in the easel serves to receive a beveled edge glass plate 20, whose top surface is flush with the top surface of the easel. The easel aperture is equal in shape and size to the individual miniature reproductions upon the face of the card 250. The card is shifted over the easel 14 until the desired miniature reproduction is located over the glass plate or window 20, and is then held in the selected position by means of a clamp 22 comprising a handle block 23 having a flat base 24 urging the card 250 into flat engagement with the upper surface of glass plate 20 under the influence of a flat spring member 25.

I shall now describe the apparatus for projecting a greatly enlarged image of the miniature reproduction upon card 250 over the glass plate 20 on to a translucent viewing screen 150 held behind the screen frame 15 by means of suitable cleats 27 fastened to the side walls 11 and 12 of the cabinet 10 This optical apparatus is the type usually spoken of as an epidiascope, by which term the art designates optical devices for projecting an image upon a screen from opaque objects illuminated by reflected light, as distinguished from projectors utilizing transparencies illuminated by transmitted light.

The epidiascope (Fig. 3) comprises an aperture plate 29 bolted to the easel 14 and serving accurately to position the glass window 20 within the easel aperture. A depending strap hanger 30, fastened to or preferably integral with plate 29 mounts a projection lens or objective 35 which screws into the lower transverse bar 31 of hanger 30. A threaded mounting as illustrated is useful for facilitating initial focusing of the objective 35 with respect to the card 250. Focusing need be done only once, however, after which the objective can be sealed in position by the application of a drop of soft solder. The objective is always maintained in fixed relationship to the top surface of the glass window 20 and the surface of card 250 immediately above the window because of the rugged construction of the objective suspension described. Because of this the focal plane of the objective is always coextensive with the reproduction upon the card and is not deviated by slight tremors of the easel.

The card lying upon the window 20, which I term an optical aperture to distinguish it from the true mechanical aperture employed in a modification of my invention (Figs. 6 and 7), is illuminated by two standard projection lamps 41 disposed horizontally at both sides of objective 35, and held in sockets 43 mounted upon partition 57. Relatively narrow metallic reflectors 47, properly curved and oriented with respect to the lamp filaments 42, serve to concentrate and redirect light from the lamps upon the card 250.

As much of the epidiascope as has been described is surrounded by a jacket 48 fastened underneath easel 14 but separated from direct contact therewith by a heat insulating plate 49 which protects the easel from the heat generated within the epidiascope. The outer ends of the reflectors 47 are supported by this jacket 48 and the inner ends thereof are fastened to the transverse bar 31. For access to the jacket, in order to replace projection lamps, large openings in the jacket are provided which are normally covered with plates 50 conforming generally to the contours of the jacket and fitted thereto by means of screws. The jacket 48 containing the projection apparatus described is bounded by the partitions 55 and 56 containing a number of apertures or grilles 57 and 58, respectively, (Figs. 2 and 3) which permit the forced circulation of air through the jacket 48.

I consider ventilation of the projecting apparatus within jacket 48 to be of the utmost importance to conserve the life of the projection lamps, and to avoid damage to the objective 35 by excess heat. Forced ventilation is preferable to reliance upon natural convection currents, because it is more reliable and efficient. Within the chamber included between the lower surface of plate 49, partition 55, side wall 11 and bottom plate 61 (Fig. 5) I provide a small noiseless electric motor 62, depending from plate 49, which drives a fan 63 which draws cool air from without the cabinet through a grille 64 into the chamber. Several baffles 65 and 66 with openings at opposite ends may be placed within the chamber to serve as a light trap. The air drawn into the chamber by fan 63 is forced through the grille 57 into the projector jacket 48 and cools the projecting lamps 41 therein and also the objective 35 and the glass window 20. Warm air issues from the jacket 48 through grille 58 in partition 56, into a duct 66 extending back into the cabinet 10, and containing several baffle plates 67 and 68, which act as a light trap. The warm air from the duct 66 is ejected through a grille 69 in the duct and side wall 12.

The electrical cords 91, 92, and 93 from the two projection lamp sockets 43 and the motor 62, respectively, (Fig. 5) are joined for simultaneous energization from a single cord 94 (Fig. 1) and plug 95, and controlled by a switch 96 conveniently mounted upon side wall 11 of the cabinet 10.

The beam of light projected by the objective 35 is directed upon the screen 150 by making use of two deflecting mirrors which preferably are front surface mirrors produced by electrical sputtering. Mirror 80 serves to deflect the beam of light emerging from the objective 35 toward a second mirror 81 which deflects the beam toward screen 150 which diffuses the real optical image formed in the plane of the screen in order to render the same visible to an observer facing the screen from a position in front of the cabinet.

Mirror 80 is supported (Fig. 3) upon the lower cross-bar 84 of a strap hanger 83 whose vertically extending arms pass through jacket 48 and embrace the depending hanger 30 to which they are secured. The mirror 80 may be secured to its support by means of adjustable cleats 85.

Mirror 81 may suitably be mounted (Fig. 2) upon slotted longitudinal bars 87 fastened to the rear wall 13 of cabinet 10 by means of cleats 88.

In a modification of my invention (Figs. 6 and 7) intended for use where it is desirable speedily to select one of the miniature reproductions upon card 250 for projection upon the screen 150, I employ a two-way slidable carriage for moving the recorder card 250 over the projection aperture in the easel 14. This modification is slightly more costly to build than the simple card holder portrayed in Fig. 1, but strongly recommends itself for applications involving continuous use of the record projector, such as it will receive in libraries and by professional and business people.

The card carriage consists of a metal bar 100 fastened to the easel 14 and provided with an aperture 101 located above the easel aperture described previously. It is to be noted that in this modification the glass plate 20 is omitted, so that there is a true aperture in the easel 14 rather than a mere optical aperture. The utility of this construction will be elucidated subsequently. Bar 100 is provided with grooves 102 within which slide two slide bars 103 whose ends are joined by a surmounting cross-bar 104, and by a grooved bar 105. Bars 104 and 105 each extend approximately the width of the easel 14. Bar 100 likewise extends the depth of the easel. The four bars 103, 103, 104, and 105 form a unitary slide which I refer to as the first slide, because upon it is mounted a second slide assembly movable at right angles to the direction of motion of the first slide. The second slide comprises a slide bar 107 slidable upon groved slide bar 105 (Fig. 6). Slide bar 107 is provided at its ends with projecting fingers 108 which, together with the adjacent edge of bar 107 are undercut to receive a glass plate 109 held against the resulting bail shaped frame by means of small cleats 111. This glass plate serves as a tray for the card 250 inserted between the fingers 108. The card is securely pressed against the perfectly flat glass plate 109 by means of a cover plate 113, which preferably is also of glass to enable the indexing indicia upon the back of the card 250 to remain visible while the card is in the card carriage. The cover plate is suitably hinged to the second slide by means of a hinge comprising a hinge plate 115 mounted upon slide bar 107, a hinge plate 116 mounted upon cover plate 113, and a pin 118 mutually linking the hinge plates. It is advisable to insert a rubber gasket 117 between the hinge plate 116 and the cover plate 113 to protect the glass against shocks and to exert an adaptable resilient pressure upon the card 250. In order to open the hinged cover plate as well as to provide a convenient means for manipulating the card carriage, I provide the hinge plate 116 with an arm 119 fitted at its end with a handle 120. By depressing this handle the cover plate is opened for the insertion or removal of a recordex card as illustrated (Fig. 6). A leaf spring 124 fastened to hinge plate 115 and bearing upon hinge plate 116 urges the cover plate 113 into contact with card 250, and serves also to resist deflection of the handle 120 due to the slight force exerted upon it to move the slides of the card carriage.

To assist in quickly and accurately positioning any desired one of the plurality of reproductions upon card 250 over aperture 101, I provide each carriage slide with a ball check mechanism which slightly impedes the motion of the card carriage in both of its dimensions of movement whenever a row or a column of reproductions is accurately positioned above aperture 101. Bar 100 contains a plurality of slight depressions 130 equivalent in number and spacing to the rows of reproductions upon card 250. Bar 105 is provided with a threaded aperture 131 whose upper end is fitted with a threaded adjustable plug 113 against which reacts a spring 132 which bears upon a ball 134 which engages the depressions 130 when the first slide is moved along bar 100. If the card 250 is completely inserted into the card holder the reproductions will be accurately positioned over aperture 101 as the first slide is moved backwards or forwards. Slide bar 107 is provided with a similar plurality of depressions 135 which engage a ball 136 set in a threaded aperture 137 containing a spring 138 reacting against ball 136 and a threaded plug 139. Thus, the columns of the reproductions upon card 250 will be accurately positioned over aperture 101 as the second slide is moved from side to side.

Adverting now to the reason for not providing aperture 101 with a glass window 20 as in the first described embodiment of my invention, it is obviously unnecessary to provide this window as a support for the card 250 because in this modification the card is supported upon the glass plate 109. The elimination of window 20 avoids a loss of light due to reflection from its lower surface, and also avoids heating of the card 250 from contact with the window 20, which absorbs a certain quantity of radiation from the lamps 41 and becomes warm. The chief advantage of aperture 101, however, lies in the improved system of ventilation which it makes possible. In this modification (Figs. 6 and 7) I reverse the action or rotation fan 63 and draw air from out of jacket 48 instead of forcing air into the same. The suction created within the jacket causes air from outside of the cabinet 10 surrounding the card carriage to flow underneath glass plate 109, thence into aperture 101 and into jacket 48. As it does so, the air cools plate 109 and the card 250 upon it, and as it flows into jacket 48 it strikes the objective 35 while it is still relatively cold, and is then deflected or flows over the hottest part of the lamps 41, namely the region near the filaments 42. The value of the improved ventilation made possible by the omission of window 20 and the use of a card carriage is too obvious to require further discussion.

I shall now briefly review the optical operation of the record projector. Rays of light 140 (Fig. 2) from the lamps 41 directly as well as indirectly from the reflectors 47 pass through window 20 and are reflected from the surface of card 250, which will be described in detail immediately hereafter. The reflected rays 141 pass through the lens 35 and emerge as a beam denoted by rays 142 which are deflected as rays 143 by mirror 80. Rays 143 are deflected from mirror 81 as rays 144 which form a real optical image in the plane of diffusing screen 150. This screen may be an ordinary translucent ground glass screen, but I prefer the highly efficient viewing screen which is part of this invention because it assures the popular success of my record projector by facilitating its use in broad daylight. This viewing screen derives its efficiency largely from its characteristic of diffusing the rays of incident light 144 through only a narrow angle or cone of light 146 (Fig. 12) which includes only the observer seated in front of the instrument, thereby preventing loss of light by diffusion towards the sides, onto the floor, and towards the ceiling.

The recordex cards 250 (Figs. 8 and 9) used with my record projector are opaque photographic prints, as distinguished from transparencies. The cards are preferably of one of the sizes adopted as standard for file cards, although they need not necessarily so be. I prefer standard four by six inch cards because they are not inconveniently large yet they are large enough to bear a practical number of miniature reproductions.

The recordex cards may be produced from master recordex negatives by either projection or contact printing upon ordinary photographic printing paper, preferably of the thickness and stiffness known as double weight paper, which approximates the paper generally used for filing cards. Each miniature reproduction 252 of a page of graphic matter is allotted a space upon the card of three-quarters by one inch, there being thirty-two such miniature reproductions 252 upon a four by six inch card, arranged in four rows 254 of eight or eight columns 255 of four (Fig. 9). Naturally the size of the reproductions need not be that given here by way of example, but I consider the dimensions given as being most practical, because the reproductions must not be too small to avoid the loss of detail resulting when they are enlarged to full size in the projector.

The back of the recordex card, that is, the plain paper surface of the card not bearing the photographic miniature, is suitable for printing or typing suitable reference indicia thereupon. Suitable indicia to be applied to the back of the card may be indicia identifying the general subject reproduced upon the card, and indicia identifying the location of the several reproductions upon the card. I have illustrated (Fig. 8) by way of example, the appearance of the back of a recordex card recording thirty-two pages of the Official Gazette of the United States Patent Office. At the top of the card are suitable indicia 260 identifying the name of the journal whose contents are reproduced upon the face of the card, and the volume, number and date of the issue, as well as the group of pages included upon the card. These indicia are preferably arranged in a manner facilitating ready recognition of a desired card when it is filed in a card cabinet with thousands of other cards. Another general indicia 261, consisting of a serial number, may be applied to the card to facilitate sorting and recognition of the cards in a large related series of cards. For instance, the cards upon which are reproduced the Official Gazette might be serially numbered from card number one containing the first thirty-two pages of volume one onward. In addition to the general indicia 260 and 261, I find it most convenient to provide individual indicia 262 for the miniature reproductions 252 located directly over the underlying miniature reproductions. These indicia 262 are preferably inconspicuous so that they will not render the general indicia difficult to read. They may be printed as dotted figures (Fig. 8) or printed with a light colored ink, so that they may be overprinted with the general indicia. The utility of the individual indicia 262 lies in the ease with which the desired miniature page reproduction 252 may be located above either window 20, or when a card carriage is employed, aperture 101. Using the first described form of my record projector, one simply moves the card 250 until the desired page number indicia 262 is located under clamp handle 23, when the desired page will be seen upon the screen 150.

It is to be noticed that the reproductions 252 are positive prints, that is, they have the same relative tone values as the original. The reproductions upon the cards are mirror images of the original along their vertical axis, but not along their horizontal axis, because the path of the light through the epidiascope and the deflecting mirrors is such as to require this reversal in order to secure a correct image upon the screen.

The master negative from which any number of recordex cards may be printed is of course the equivalent of the cards except that it is a negative transparency instead of an opaque positive, and it does not of course bear the printed indicia. The master negative can be prepared directly by photographing the originals with a special camera adapted for use as a multiple exposure camera and provided with means for masking out all of the area of the negative except that one upon which a miniature reproduction is to be impressed. This camera I shall describe in another patent. Other methods of producing the master negatives will readily suggest themselves to those skilled in the art of photography.

It is not necessary to limit the size of the miniature reproductions 252 to a standard unit size.

If for instance it is desirable to reproduce a large chart or map, the same may be reproduced upon a card 250 in toto, only small areas of the map being projected at a time. This is a unique advantage not possessed by the old method of recording on moving picture film, upon which a large map must be reproduced either greatly reduced or as a large number of unconnected noncontiguous fragments spaced along a strip of film.

Although careful photographic technique will yield recordex cards which upon projection and attendant enlargement will not suffer a loss of detail or show grain, for the highest quality reproduction I have provided a special card having fine grain characteristics, great strength, and resistance to curling. These special cards are made of some sheet synthetic plastic material filled or incorporating a white pigment of high reflectivity to render the sheet white and of high light reflecting power. The back of the sheet is preferably roughened or a matte surface so that it will receive the written or printed indicia previously described. The face of the card is coated with a fine grain photographic emulsion. This card is exposed as would be the ordinary cards previously described, and is then developed preferably by a fine grain developing method. These cards will yield images having extremely sharp detail, and they are also more wear resistant, stronger and less subject to warping than are ordinary photographic prints.

The function of both reflective and translucent projection screens is to diffuse the substantially parallel rays of projected light incident upon any small area of the screen, so that the rays are scattered in all directions, thereby making the entire screen visible to observers stationed at many different locations. The reason that the real optical image formed by a projector is invisible is that without diffusion only a few of the rays from the image, that is from the projector, reach the eyes of the observer. The remainder of the rays, because of the divergence of the projection beam, do not reach the eyes of the observer.

Diffusion has hitherto been accomplished by the use of sheets of rough textured material, such as linen sheets or ground glass, the minute inequalities of whose surface cause the diffusion of incident light. Because these minute surface irregularities occur more or less at random, the degree and extent of the surface diffusion of such textured materials is symmetrical around the axis normal to the point of incidence of a ray of light. Although artificially prepared screens, such as the familiar beaded screens, have been developed which have controlled diffusion characteristics, such as narrow angles of diffusion, these screens also possess symmetrical diffusion characteristics because they are manufactured by the random application of special comminuted reflecting material to a prepared backing. Symmetrical diffusion is undesirable because it does not permit compensation for the divergence of the incident beam of projected light. For instance, with most diffusing media, the relative intensity of rays diffused at an angle is much less than that of the rays diffused normal to the screen. This is especially true if the incident rays strike the screen at an angle, as they do at the edge of the screen, as compared to normal incidence near the center of the screen. Symmetrical diffusion is also undesirable because even in the case of the screens hitherto known which diffuse light within a relatively narrow zone of diffusion, it has been impossible to direct that zone towards any desired point of observation to the exclusion of others, because the nature of the diffusing surfaces hitherto in use did not permit asymmetrical diffusion.

It has indeed been attempted to obtain controlled diffusion by embossing a screen surface with myriads of tiny lenticular facets. This method was never successful because to compensate for the divergence of the projected beam and to control the direction and intensity of diffusion required that each facet, or at best a small group of facets, over the entire area of the screen have different surface contours. The labor required in cutting the dies or molds for these millions of differently shaped minute lenticular facets is obviously too great to justify the effort.

It is necessary in all prepared screens of this class that the minute diffusing surfaces be double curved in form or in effect. To provide one surface of a sheet of polished reflecting metal with two sets of parallel lenticular grooves intersecting at right angles will not produce a diffusing screen reflecting in all directions because the intersection of the lenticular grooves is not a double curved surface. Because grooves are so much simpler to prepare than are individual facets, it has been suggested that a screen be prepared with vertical grooves of concave diffusing cross-section and that these grooves then be provided with a series of parallel horizontal scratches. This procedure will not result in a true double curved surface because the irregular surface of the scratches does not result in controllable asymmetric diffusion and also destroys the effect of the longitudinal grooves.

I have discovered that the effect of a double curved diffusing surface can be obtained without the use of double curved facets or grooves. A typical refractively diffusing viewing screen (Fig. 10) according to this invention consists of a transparent glass or synthetic plastic sheet 152. One side of the sheet 152 is provided with a multiplicity of concave or convex parallel horizontal lenticular grooves 154. The other side of the sheet is provided with a like set of lenticular grooves 156 running vertically, or substantially at right angles to the direction of the first set of grooves 154. As illustrated (Fig. 10), the curvature of the grooves seems to be identical, because the highly magnified section of a screen that is illustrated contains only a few grooves which do not vary noticeably in curvature within a small distance. The curvature of the grooves as the edges of the screen are approached do differ noticeably from that of the central grooves, however, becoming gradually more asymmetrical. Because it is necessary to correct for the divergence of the projector beam, the grooves near the edge of the screen are not symmetrical in cross-section, but are thicker at their edge closest to the center of the screen than at their edge furthest from the center of the screen (Fig. 11). The curvature of the grooves preferably is either circular or elliptical, because that shape, as I shall describe at length later on, is easier to produce, but the shape of the grooves is based upon the use of different portions of a circle or ellipse included between radii whose angularity with respect to the horizontal can be calculated for any desired type of screen by the use of mathematical methods to be disclosed subsequently.

My screen diffuses and makes a real projected optical image visible to the observer in the following manner. The image from the projector is focused upon say that side of screen 150 containing the vertical grooves 156 so that the screen is coextensive and substantially coplanar with the focal plane of the image. The image is divided into a large number of parallel vertical and substantially coplanar strips by the vertical grooves 156. The image strips are each refractively diffused in the horizontal plane by the vertical lenticular grooves 156, but the vertical course of the light rays is not affected. The rays spread out fanwise from each groove 156, when seen in horizontal section, until they reach the set of horizontal grooves 154. The partially diffused image is divided into a large number of parallel horizontal and substantially coplanar strips by the horizontal grooves 154 and each image strip is then refractively diffused fanwise in the vertical plane, when seen in section. The net result is a visible image properly diffused in all directions, produced by using only single curved, readily producible surfaces.

The width of the grooves is conditioned by the use to which the screen is to be put. I prefer to make the grooves narrower than the smallest desirable image detail, or even below the resolving power of the human eye so that the grooves remain invisible at ordinary viewing distances.

Although I speak of grooves, I use the term in a sense including lenticular ribs or ridges, which are the optical equivalent of lenticular grooves. Screens according to my invention may have convex grooves upon both sides (Fig. 11), or they may bear concave grooves upon both sides (Fig. 12), or the grooves may be concave upon one side and convex upon the other (Fig. 13).

The grooves may be cut directly upon a sheet of transparent plastic material, but I prefer to make master molds, rollers, or matrices from which any number of screen replicas can be obtained. Single sheet screens may be produced by molding synthetic plastics between two rollers or matrices, each bearing one set of the respective grooves 154 and 156. Similarly, glass screens can be made by casting or molding glass between molds.

Instead of molding the screens, I have discovered that the screens may be built up from seperate layers or laminations, each of which bears only one set of grooves one one surface. These single layers are readily prepared by coating a matrix containing the appropriate grooves with a liquid plastics solution, which evaporates or dries, leaving remaining a thin flexible film, which can be stripped or peeled from the matrix, retaining an accurate impression of the matrix grooves. These single layers 160 and 161 may then be applied to a smooth layer of glass or sheet plastic 162 (Fig. 13) by means of layers of transparent plastic cement 164. Great care should be used in the cementing process to avoid the inclusion of air bubbles. If a rigid screen is not desired, the thin grooved films 160 and 161 can be cemented together by a layer of transparent plastic cement 164 without the inclusion of a relatively thick supporting layer 162 (Fig. 14).

The screens I have described up to now have been translucent refractively diffusing viewing screens. My invention is not confined to translucent screens, however, for I am enabled to prepare reflectively diffusing screens by the simple expedient of coating one of the numerous types of refractively diffusing viewing screens previously described with a reflecting metallic film. A reflecting screen (Figs. 15 and 16) according to my invention may comprise a transparent sheet of glass or synthetic plastics 152 provided with a set of parallel lenticular grooves 154 upon one side, and a second set of parallel lenticular grooves 156 upon the other side, running preferably at right angles to the first set of grooves. The rear of the screen is coated with a highly reflecting metal film by either chemical deposition or cathodic sputtering, both which processes are well known to the art and do not require further description.

The most important difference between my reflecting screen and the refractively diffusing screens previously described lies in the much smaller curvature of the grooves of the reflecting screen as compared to that of the refracting screen. The requisite curvature for the reflecting grooves 156 is roughly half that of the curvature of the refracting grooves, because the diffusion at the metallic surface of the reflecting screen is not the result of refraction, as it is at the grooves 154, but is due simply to reflection from the curved surface of the grooves 156. The curvature of the refracting grooves 154 need be only approximately half that of the corresponding grooves of a translucent screen because the light, after being diffused once by the grooves 154 is reflected back through them by the metallic film 170 and is again refractively diffused by the grooves 154. Because these grooves perform two refractive diffusions their curvature need be only about half as great as that of the grooves 154 of a translucent screen.

My reflectively diffusing viewing screens can be modified similarly to the refractively diffusing viewing screens described. They may be provided with convex grooves upon both sides (Fig. 16), or with concave grooves upon both sides (Fig. 17), or with convex grooves 154 upon one side and concave grooves 156 upon the other side (Fig. 18). The screens may also consist of stripped films 160 and 161, produced as described previously, each bearing one set of grooves 154 and 156, respectively, which films may be cemented together by means of transparent plastic cement 164 (Fig. 17), or may be cemented upon a plate glass support 162 by means of transparent adhesive films 162. All of these modifications are, of course, coated with a metallic reflecting film 170 upon their back surface.

My reflectively diffusing viewing screen diffuses and makes a real optical image projected thereupon visible to the observer in the following manner. The image from the projector is focused upon the screen so that the screen is coextensive and substantially coplanar with the focal plane of the image. The image is divided into a large number of parallel horizontal and substantially coplanar strips by the horizontal lenticular grooves 154. The image strips are each refractively diffused in the vertical plane by the horizontal grooves 154, but the horizontal course of the light rays is not affected until they reach the set of vertical grooves 156 covered with the reflecting metal film 170. There the partially diffused image is divided into a large number of parallel vertical and substantially coplanar strips by the vertical grooves 156 and each image strip is then reflectively diffused in the horizontal plane, the light rays being reflected back toward the plane of the horizontal grooves 154. There the partially diffused image is divided for a third time into a large number of parallel horizontal strips which are coextensive and coplanar with the first-mentioned set of horizontal strips because they are the result of a refractive diffusion by the first-mentioned set of horizontal grooves 154. The net result of these successive refractive, reflective, and refractive diffusions is a visible image properly diffused for visibility in all directions, produced by the use of readily producible single curved surfaces only.

The grooves may be cut upon smooth sheets of plastics, or upon the matrix blanks or the mold blocks by the use of tools similar to lathe or planer tools (Fig. 19). I prefer to use a lathe for cutting the blanks, which I prepare for cutting by wrapping the sheet of copper or other soft metal used for the blank around a mandrel. I may also prepare the blanks by cutting the grooves in a wax cylinder, which is then electrotyped to produce the blank. An accurate screw cutting lathe is used, in order evenly to space the grooves in order to avoid overlapping thereof or spaces between the grooves. The cutting tools used resemble ordinary lathe tools, except that they are quite small. A plan view (Fig. 19) of one of the groove cutting tools 180 depicts the relatively massive shank 181 of the tool, which tapers down to a neck portion 183 via shoulders 182. This neck portion, before the formation of the bit 185, extends as indicated by the phantom lines 184. The sides of the neck portion are ground accurately parallel and the width of the neck 183 is accurately predetermined. A hole, indicated by the phantom lines 188, of radius $r$ is then drilled and reamed or lapped near the end of the neck, exactly along the center line 186 of the neck. The sides of the neck are then ground off, leaving the bit 185. The end 187 of the bit 185 will have a greater or less degree of curvature, depending upon how much of each side of the neck is ground off. Denoting the desired curvature of the bit end 187 from the center line 186 by the symbols $\alpha$ and $\alpha'$ respectively, the widths of the bit measured from the center line 186, denoted by the symbols $t$ and $t'$ can easily be computed from the formulae $$t = r \sin \alpha \qquad (1)$$

$$t' = r \sin \alpha' \qquad (2)$$

Knowing the respective half-widths $w$ of the neck 183, the amount to be ground off from the side of each neck can accurately be computed and measured.

The curvature of the grooves must be different at different locations along the screen. Because the curvature does not change rapidly, it is not necessary that each groove be cut with a tool of different curvature; instead, each set of grooves upon each side of the screen is divided into zones of different curvature. Each zone contains a large number of lines of the same curvature. Relatively few zones are necessary, seldom over ten zones for each side of the screen.

Because the several tools are to be used to cut grooves having different degrees of curvature, the total width of the grooves would vary if the same diameter hole 188 were employed when making each tool. This would cause trouble if a screw-cutting lathe is employed to cut the matrix grooves because the tool 180 would be advanced a uniform distance by the lead screw of the lathe rather than the varying widths of the grooves cut by the succession of tools used. Consequently, I select a different radius $r$ for each tool so that the total width $(t+t')$ of the bit is the same for all of the tools made, regardless of their curvature.

Tools made as described above will cut grooves whose curvature is an arc of a circle. By drilling the hole 188 at an angle, tools can be produced which will cut grooves having an elliptical cross section of any desired degree of curvature. Elliptical grooves have the property of producing a slightly different intensity distribution of diffusion within the same limits of diffusion as the circular grooves.

I have spoken of the varying curvature of the lenticular grooves of my screens, which curvature determines both the direction, extent and intensity of the diffusion produced by the grooves. I shall now proceed to describe the manner in which the requisite curvature of a groove may be calculated to produce any desired degree of dispersion and any desired relative light intensity. Thereafter I shall describe the manner of calculating an entire set of grooves for a refractive diffusing screen to be used in the record projector previously described. All of these calculations have been greatly simplified by making the computations for planes passing through a central vertical or horizontal plane normal to the direction of the groove whose effect is the subject of the computation, and exactly bisecting the groove parallel to the plane at the other side of the screen, so that a ray striking the last said groove may be treated as striking a flat surface planar with the back screen surface. By this expedient the vertical or horizontal diffusion characteristics of single grooves, or of a screen, may be computed for the central planes, which procedure gives a very accurate picture of the screen characteristics, without engaging in the exceedingly complicated calculations required for the treatment of skew rays passing through two grooves at right angles to each other upon opposite sides of a screen.

A fragmentary vertical section through a screen 150 (Fig. 20) bisecting one of the vertical grooves of the screen may be depicted as a circular arc 212, representing the outer edge of one of the horizontal grooves, bounded by a vertical straight line representing the edge of a vertical groove. Naturally, this diagram can be made to represent a horizontal section through a screen with equal accuracy, by interchanging the words horizontal and vertical used in this description.

A ray 144 directed downward toward the screen 150 and contained in the vertical plane bisecting one of the vertical grooves of the screen strikes the vertical groove on an angle $\theta$ to the horizontal. Angle $\theta$ is measured positively in the direction from the horizontal indicated by the arrow 207. The ray 144 is partially reflected in the direction indicated by the dotted line 210, the percentage loss due to the reflection being denoted by the symbol $R_1$. Upon entering the screen, ray 144 is refracted, the extent of refraction depending upon the refractive index of the screen material, denoted by the symbol $n$. The refracted ray 145 passes through the screen and strikes the curved outer surface 212 of one of the horizontal grooves, at which surface the ray 145 is partially reflected in the direction indicated by the dotted line 211, the percentage of the light lost by reflection at the surface 212 being denoted by the symbol $R_2$. The degree of curvature of the horizontal groove at the point at which the ray 145 strikes its surface 212 is measured by the angle $\alpha$ measured in the direction of the arrow 208 and included between the radius 214 passing through the point and the horizontal line 213 passing through the center of curvature o of the groove. Upon passing through the surface 212 ray 145 is again refracted and emerges as the ray 146 which makes an angle denoted by the symbol $\Sigma$ with the horizontal. This angle is reckoned as positive in the direction of the arrow 209. The total percentage of the incident light contained in ray 146 is denoted by the symbol T.

From a formula first derived by Fresnel, it is possible to calculate the reflection losses at the boundaries of transparent solids, if the index of refraction $n$ is known and also the angle of incidence or emergence. The losses at various angles of incidence are tabulated below for a transparent medium having a refractive index of 1.55. Intermediate values can of course be obtained by interpolation.

| Angle of incidence | Reflection loss |
|---|---|
| | Per cent |
| 0° | 4.65 |
| 10° | 4.66 |
| 20° | 4.68 |
| 30° | 4.82 |
| 40° | 5.26 |
| 50° | 6.50 |
| 60° | 9.73 |
| 70° | 18.00 |
| 80° | 39.54 |
| 90° | 100.00 |

To obtain the percentage reflection losses $R_1$ or $R_2$, it is necessary merely to find the value of the reflection loss from the table corresponding respectively to the angles of incidence $\theta$ or $\Sigma + \alpha$ respectively. The value of T can then be computed from the formula:

$$T = \frac{(100 - R_1)(100 - R_2)}{100} \quad (3)$$

By means of mathematical methods which will be apparent to those skilled in the art of optical calculation, I have derived the following equation giving the value of angle $\Sigma$ in terms of the angle of incidence $\theta$, the degree of curvature $\alpha$, and the index of refraction $n$:

$$\Sigma = \sin^{-1}(\sin \alpha \sqrt{n^2 - \sin^2 \theta} - \cos \alpha \sin) - \alpha \quad (4)$$

In order to avoid laborious computation involving Equation 4, and to simplify later calculations, I have substituted a large number of different values of $\alpha$ and $\theta$ in Equation 4 and solved the same for $\Sigma$. The results of these computations are embodied in a group of curves 220 (Fig. 21) describing the relationship between the variables $\Sigma$, $\theta$, and $\alpha$, for $n = 1.55$. It is to be noted that the curves 220 do not extend beyond the dotted lines 221, which indicate total reflection of the ray 145 occurs at the groove surface 212 (Fig. 20).

By the use of these curves (Fig. 21) and by the application of the principles of screen design promulgated in the succeeding pages, it is possible to compute the proper curvature of all of the grooves of any desired type of refractively diffusing viewing screen. Reflective screens may be designed by the application of similar methods of calculation, which can readily be improvised by any skilled optical designer.

I have also prepared a set of curves 225 (Fig. 22), describing the relationship for $n = 1.55$ between the angle of incidence $\theta$, the degree of curvature $\alpha$ of the groove under consideration, and the per cent of light transmitted T. The data for these curves were computed by obtaining the values of $R_1$ and $R_2$, from the table of reflection losses previously set forth, corresponding to various values of Σ, α, and θ obtained from the curves 220 (Fig. 21), and substituting these values of R₁ and R₂ in Equation 3.

From these transmission curves can be calculated the relative intensities of the rays of light emerging at any angle from the grooves of any refracting screen upon which rays of light are projected at any angle of incidence.

The proper curvature of the grooves is largely a matter of choice, much as are the dimensions of the parts of a machine. Depending upon whether a screen of high efficiency and narrowing viewing angle is desired, or whether a screen having a broader range of view with a somewhat smaller efficiency is preferable, the grooves are made with a small or large curvature, respectively. The grooves near the edge of the screen are preferably made to give a smaller range of view to compensate for their smaller efficiency caused by their having to compensate for the divergence of the outer rays of the projector beam.

Because the apparatus and methods disclosed herein are merely specific examples of my invention, which can be carried out in many different but generically similar forms, I wish to be limited only by the scope of the following appended claims.

I claim:

1. A refractively diffusing projection screen comprising a transparent sheet one side of which bears a multiplicity of parallel lenticular grooves and the other side of which sheet bears a multiplicity of parallel lenticular grooves running substantially at right angles to the aforesaid grooves, some of said lenticular grooves upon one of said sides being different than others of said lenticular grooves upon the same side, said difference being characterized by the fact that at least some of said grooves are asymmetrical and further by the fact that substantially progressively in one direction at least some of said grooves are more asymmetrical than others of said grooves, and wherein said lenticular grooves conform substantially to the following formula $$\Sigma = \sin^{-1}(\sin \alpha \sqrt{n^2 - \sin^2 \theta} - \cos \alpha \sin \theta) - \alpha$$

wherein angle Σ is the angle of refraction of the emergent ray relative to a line normal to the plane of the screen and angle θ is the angle of incidence and α is the degree of curvature and $n$ is the index of refraction.

2. A refractively diffusing projection screen comprising a transparent sheet one side of which bears a multiplicity of parallel lenticular grooves and a second transparent sheet one side of which bears a multiplicity of parallel lenticular grooves, the smooth faces of said sheet being cemented together by a transparent adhesive with the lenticular grooves of said sheets oriented substantially at right angles to each other, some of said lenticular grooves upon one of said sheets being different than others of said lenticular grooves upon the same sheet, said difference being characterized by the fact that the grooves adjacent the center of the sheet are substantially symmetrical while grooves spaced outwardly from said center are generally progressively more asymmetrical, with the inner edges of said outer grooves being thicker than the outer edges thereof, and wherein said lenticular grooves conform substantially to the following formula $$\Sigma = \sin^{-1}(\sin \alpha \sqrt{n^2 - \sin^2 \theta} - \cos \alpha \sin \theta) - \alpha$$

wherein angle Σ is the angle of refraction of the emergent ray relative to a line normal to the plane of the screen and angle θ is the angle of incidence and α is the degree of curvature and $n$ is the index of refraction.

3. A refractively diffusing projection screen comprising a transparent sheet one side of which bears a multiplicity of parallel lenticular grooves and a second transparent sheet one side of which bears a multiplicity of parallel lenticular grooves, and a third transparent sheet upon one side of which is cemented by means of transparent adhesive the smooth side of the first grooved sheet and upon the other side of which is cemented by means of transparent adhesive the smooth side of the second grooved sheet with its grooves oriented substantially at right angles to the grooves of the first sheet, a portion of the grooves on each of the first and second sheets being asymmetrical and some of this portion being more asymmetrical than others of this portion and said first and second sheets being cemented to said third sheet with asymmetrical grooves upon one of the outside sheets being oriented opposite grooves upon the other of said outside sheets of substantially the same degree of asymmetry.

4. A refractively diffusing projection screen comprising a transparent sheet one side of which bears a multiplicity of parallel lenticular grooves and the other side of which sheet bears a multiplicity of parallel lenticular grooves running substantially at right angles to the aforesaid grooves, the width of said grooves being less than the smallest desirable image detail, at least a portion of said grooves upon each side of said sheet being asymmetrical and the asymmetry of said grooves increasing substantially progressively in at least one direction upon each side of said sheet, and grooves upon one side of said sheet being substantially opposite grooves upon the other side of said sheet having substantially the same degree of asymmetry.

5. A projector of the class described having a refractively diffusing projection screen comprising a transparent sheet one side of which bears a multiplicity of parallel lenticular grooves and the other side of which sheet bears a multiplicity of parallel lenticular grooves running substantially at right angles to the aforesaid grooves, said grooves having varying curvatures and varying degrees of asymmetry to compensate for the divergence of the projection beam, and said grooves acting to diverge the projected beam within a narrow solid angle such that the beam within said solid angle at the normal observing position will be substantially blocked by the observer so that strong incident light cannot fall upon the screen at such an angle that it will be reflected within the said solid angle.

6. A projector of the class described having a refractively diffusing projection screen comprising a transparent sheet one side of which bears a multiplicity of parallel lenticular grooves and the other side of which sheet bears a multiplicity of parallel lenticular grooves running substantially at right angles to the aforesaid grooves, said grooves having varying predetermined curvatures and varying degrees of asymmetry to cause the projected light to be diffused within a relatively narrow predetermined viewing zone, and said grooves acting to diverge the projected beam within a narrow solid angle such that the beam within said solid angle at the normal observing position will be substantially blocked by the observer so that strong incident light cannot fall upon the screen at such an angle that it will be reflected within the said solid angle.

7. A reflectively diffusing projection screen comprising a transparent sheet one side of which bears a multiplicity of parallel lenticular grooves and the other side of which sheet bears a multiplicity of parallel lenticular grooves running at right angles to the aforesaid grooves, some of the grooves upon each of said sides being asymmetrical and some of said grooves being more asymmetrical than others of said grooves and grooves of approximately the same degree of asymmetry being oriented opposite each other, one side of said sheet being coated with a metallic reflecting film.

8. A reflectively diffusing projection screen comprising a transparent sheet one side of which bears a multiplicity of parallel lenticular grooves and the other side of which sheet bears a multiplicity of parallel lenticular grooves running at right angles to the aforesaid grooves, one side of said sheet being coated with a metallic reflecting film, and said lenticular grooves having varying predetermined curvatures to cause the projected light to be diffused within a relatively narrow predetermined viewing screen, and the curvatures of at least some of said grooves being asymmetrical and some of said grooves being more asymmetrical than others of said grooves, and wherein said lenticular grooves conform substantially to the following formula $$\Sigma = \sin^{-1}(\sin \alpha \sqrt{n^2 - \sin^2 \theta} - \cos \alpha \sin \theta) - \alpha$$

wherein angle $\Sigma$ is the angle of refraction of the emergent ray relative to a line normal to the plane of the screen and angle $\theta$ is the angle of incidence and $\alpha$ is the degree of curvature and $n$ is the index of refraction.

9. A record projector comprising a cabinet provided with an easel and with a viewing screen as claimed in claim 3, an optical aperture in said easel, and an epidiascope including a suitable deflecting system within said cabinet for projecting an enlarged image of an object above said aperture onto said viewing screen.

10. A record projector comprising a cabinet including an easel and a viewing screen as claimed in claim 3, an optical aperture in said easel, a photographic print upon said easel bearing a plurality of miniature photographic reproductions arranged in closely adjacent row and column formation, and an epidiascope including a suitable deflecting system within said cabinet for projecting an enlarged image of the miniature reproduction over said aperture upon said viewing screen.

GERHARD LESSMAN.

Certificate of Correction

Patent No. 2,326,042. August 3, 1943.

GERHARD LESSMAN

It is hereby certified that error appears in the printed specification of the above numbered patent requiring correction as follows: Page 9, first column, line 47, for that portion of the formula reading $$\sqrt{n^2-\sin^2\theta} \quad \text{read} \quad \sqrt{n^2-\sin^2\theta}$$

and that the said Letters Patent should be read with this correction therein that the same may conform to the record of the case in the Patent Office.

Signed and sealed this 12th day of October, A. D. 1943.

[SEAL]

HENRY VAN ARSDALE,
*Acting Commissioner of Patents.*